N. STOW.
Improvement in Flexible Shafts.
No. 130,253.  Patented Aug. 6, 1872.
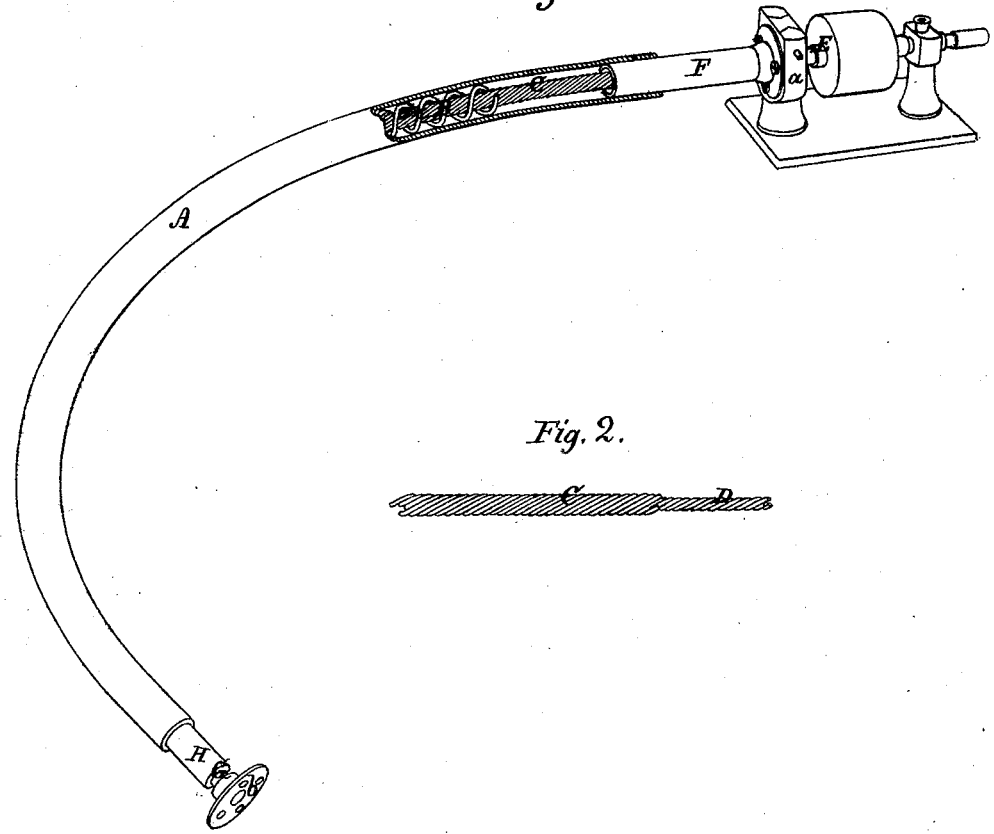
Witnesses  
N B Smith  
C C Wilson
Inventor  
Nelson Stow  
by his atty  
H H Doubleday

UNITED STATES PATENT OFFICE.

NELSON STOW, OF BINGHAMTON, NEW YORK.

IMPROVEMENT IN FLEXIBLE SHAFTS.

Specification forming part of Letters Patent No. 130,253, dated August 6, 1872.

SPECIFICATION.

I, NELSON STOW, of Binghamton, in the county of Broome and State of New York, have invented certain Improvements in Flexible Shafts, of which the following is a specification:

My invention relates to the combination and arrangement of a wire-shaft for conveying motion to machinery or other purposes, consisting of a central cord composed of several strands of steel wire inclosed by a layer of brass wire, twisted or wound in the same direction and pitch, and fitted loosely in a flexible tubular casing, with bearings at the ends, in such a manner that one end shall be free to be placed in any direction from the shaft of the driving-power, or held in the hand to communicate motion for any purpose within its reach.

Figure 1 of the accompanying drawing is a view of a casing, which incloses a shaft bent at a right angle with the shaft of the driving-belt, embodying my invention, with a section of the case removed. Fig. 2 is a section of the shaft detached.

A is the casing of the shaft, the body of which is made of spirally-coiled wire, B, covered with leather or other flexible material. C is the shaft, which is made by twisting a central cord, D—the end of which is shown by Fig. 2—composed of several strands of steel wire, which insures its strength and elasticity. It is then inclosed with a layer of brass wire, wound at the same pitch and direction, which also gives it additional strength without materially diminishing its flexibility. E is a belt-shaft, which works in ordinary bearings, and is connected with the end of the shaft C. F is the socket on the end of the stationary end of the casing A, which socket is attached to the bearing-block $a$. G is the free end of the flexible shaft C, which has a journal attached to it, which works in a socket-bearing, H, connected with the end of the casing A. The end of this journal is provided with a collar, $b$, for connections when the communicated motion is to be continued in one direction. When used for consecutive changes of direction the collar may be dispensed with, and an appliance attached to be guided by hand. The free end of the shaft may then be readily adapted to communicate motion at any point within its reach on the bench of the machine, or for many domestic purposes. The peculiarity of its construction will also allow of its use for driving heavy machinery.

*Claims.*

I claim as my invention—

1. The flexible shaft herein described, consisting essentially of the steel cord D, covered with brass wire C, constructed and operating as and for the purpose specified.

2. In combination with the aforesaid parts D C, the wire spring B and flexible covering A, all constructed and operating in the manner and for the purpose specified.

NELSON STOW.

Witnesses:
S. W. ROGERS,
J. C. ROBIE.